US007404061B2

(12) United States Patent
Jordan

(10) Patent No.: US 7,404,061 B2
(45) Date of Patent: Jul. 22, 2008

(54) PERMANENT POOL MEMORY MANAGEMENT METHOD AND SYSTEM

(76) Inventor: David A. Jordan, 3508 Josh La., Austin, TX (US) 78730

( * ) Notice: Subject to any disclaimer, the term of this patent is extended or adjusted under 35 U.S.C. 154(b) by 346 days.

(21) Appl. No.: 11/057,664

(22) Filed: Feb. 14, 2005

(65) Prior Publication Data

US 2006/0184759 A1 Aug. 17, 2006

(51) Int. Cl.
*G06F 12/02* (2006.01)
(52) U.S. Cl. ....................................... 711/170; 711/219
(58) Field of Classification Search ....................... None
See application file for complete search history.

(56) References Cited

U.S. PATENT DOCUMENTS

| 5,548,751 | A  | * | 8/1996  | Ryu et al. .................... 707/102 |
| 6,076,151 | A  | * | 6/2000  | Meier .......................... 711/171 |
| 6,594,749 | B1 | * | 7/2003  | Czajkowski ................. 711/170 |
| 2004/0230762 | A1 | * | 11/2004 | Allen et al. ................. 711/170 |

OTHER PUBLICATIONS

Lefebvre, Philip J., "Reclamation of Memory for Dynamic Ada Tasking", Annual International Conference on Ada Proceedings of the 1987 Annual ACM SIGAda International Conference on Ada, Dec. 1987, ACM Press, pp. 199-207.*

Adolphson et al., "Optimum Ordered Hash Tables", ACM/CSC-ER Proceedings of the 1977 Annual Conference, Jan. 1977, pp. 74-78.*

* cited by examiner

*Primary Examiner*—B. James Peikari
(74) *Attorney, Agent, or Firm*—Hulsey IP Intellectual Property Lawyers, PC

(57) ABSTRACT

A method, system, and computer program manager for a computing system memory in the operation of a computing process. At least one memory segment provides memory resources for the computing process. The memory segment includes a plurality of memory objects, each of the memory objects includes an equal number of bytes and has a predetermined order that associates the address of the memory object in the memory segment to the addresses of the remainder of the plurality of memory objects. A pointer identifies a first memory object from the plurality of memory objects. The first memory object occupies a first ordered position according to the predetermined order. The process allocates the first memory objects from the memory segment during the operation of the computing process. The pointer increments to a second memory object having a second ordered position relative to the first memory object. The process continues the allocating and incrementing steps on subsequently ordered memory objects within the memory segment as required by the computing process. The process deconstructs the at least one memory segment only upon the completion of the computing process.

8 Claims, 4 Drawing Sheets

PERMANENT POOL MEMORY MANAGEMENT METHOD AND SYSTEM

FIELD OF THE INVENTION

This invention pertains to computer memory management methods and systems, and, more particularly to a permanent pool memory method and system for establishing and managing a computer memory pool for a wide variety of computer processes.

BACKGROUND OF THE INVENTION

Memory management issues are central to program performance, because memory is a scarce resource for processors. Therefore, it is incumbent for computer processes to use memory resources most efficiently in order for a program to scale well. It is also relatively expensive in terms of operating processor resources to allocate memory during a programming operation. Consequently, most computer programs spend a considerable amount of operation time in allocating and freeing memory.

Memory management generally involves manipulating a data structure known as the "heap." For practical purposes, a heap includes a large block or segment of a processor that the computer makes available to the program. A newly started program has a large clean and coherent heap. However, as a program runs for an extended period of time, the heap degrades. The large clean and coherent heap becomes splintered into many smaller memory segments. As a result, complicated data structures are necessary to keep track of all of the smaller segments. As further degradation occurs, the operating resource cost of allocating and freeing a block of memory necessary increases.

To prevent splintering memory into ever-smaller segments, some memory manager programs allocate memory on selected block sizes. For example, a memory manager program may return 128 bytes in response to any request for 100 bytes. When this memory is released, the memory manager can use that buffer for any future request no greater than 128 bytes. This is effective at reducing memory fragmentation for a general-purpose memory allocator. Unfortunately, use of a buffer introduces significant overhead when allocating many blocks of a specific size.

Another problem for memory manager programs deals with locality of the data. Since a memory manager program typically has no knowledge about how to use the memory blocks, there can be no guarantee that similar data blocks are located near each other in the processor memory. When the various memory blocks are accessed, the operating system has to retrieve the correct "page" of memory. Such memory may be paged out to a disk, in RAM, in the cache or already present in the CPU itself. As computer operating speeds continue to increase, the difference in speed between accessing these various types of memory continues to increase. The operating system may attempt to access as the fastest available memory the most recently used memory and the memory just past that currently in use. This requires the use of a read-ahead that assumes that such memory will be next accessed. Since a memory manager program cannot guarantee that related blocks are kept near each other, applications that allocate and release many small blocks tend to have very poor locality characteristics. The result is yet poorer performance.

Memory management, therefore, represents an important area of computer process architecture. Accordingly, many strategies have emerged to maximize the efficiency of memory allocators that support memory management requirements. One such technique is generally referred to as a "memory pool." In the memory pool approach, a large block of memory is allocated and partitioned into equal sized pieces. These equal sized pieces are held in some kind of list, usually a linked list. Whenever the programming computer process needs a block of memory of that size, the process will access a block off this list, instead of accessing the general memory manager.

Several advantages associate with the use of a memory pool. For instance, the individual blocks in the pool require no memory overhead to keep track of them. Consequently, using a memory pool can be quite efficient. Allocations and memory frees are quite efficient, because simply accessing the memory pool requires no searching. Only the top of the memory stack is manipulated. And, quite importantly, memory pool usage reduces the demands on the general memory manager, which may manage the rest of the computer's memory more efficiently.

There are, however, limitations associated with the use of a memory pool. First of all, with the memory pool, the client program must manage the memory allocation and release. Another limitation relates to the requirement that the memory in question must generally be allocated for the full operational period of the computer program. Although individual allocations and frees are quite efficient, when compared to the general memory manager, handling large numbers of individual allocations are still expensive. This follows from the requirement that each object must be added to and removed from lists individually.

Another approach to efficient memory management calls for allocating memory off of the "stack." For the most part, this corresponds to a program's "local variables." Stack allocations are generally very fast, since they require only a single subtraction. They also provide the additional benefit of not degrading the stack at all. This benefit distinguishes from heap allocations, which progressively degrade the heap over time, as described above.

There are, however, two significant limitations associated with the use of stack memory. The first limitation exists when the total amount of memory available is quite restricted when compared with the total heap memory. The second limitation is that stack memory becomes inaccessible when the function in which it was allocated "falls out of scope. This is true, even though stack memory may be very useful for problems that are clearly bounded in time.

BRIEF SUMMARY OF THE INVENTION

The present invention provides a system and method for managing computing system memory by constructing and maintaining a memory segment or pool of memory objects in a manner that overcomes or substantially avoids limitation associated with known memory management processes for computing environments.

According to one aspect, the present invention provides a method, system, and computer program for constructing at least one memory segment. The memory segment provides memory resources for a computing process operating on a computing system. The memory segment includes a plurality of memory objects; each of the memory objects including an equal number of bytes and having a predetermined order associating the address of the memory object to the addresses of the remainder of the plurality of memory objects. The process involves constructing a pointer for identifying a first memory object from the plurality of memory objects. The first memory object occupies a first ordered position according to the predetermined order. Then, the process allocates the first memory objects from the memory segment during the operation of the computing process. Incrementing the pointer to a second memory object occurs next, with the second memory object having a second ordered position relative to the first memory object. The process continues with allocating and incrementing steps on subsequently ordered memory objects of the memory segment as the supported computing process may require. Once the computing process completes, the process deconstructs the at least one memory segment only upon the completion of the computing process.

The present invention combines attractive features of the memory pool approaches with the time-boundedness of stack allocations. As such, the present embodiment includes a memory allocation process for establishing a "permanent memory." This results in performance similar to that of an allocation off a memory stack. The benefit occurs, however, without either the restriction of staying within the scope of a function or the difficulty of using the scarce stack memory rather than the more plentiful heap memory. Unlike a memory pool, the objects may have varying sizes. Like the memory pool, however, the allocated individual objects do not incur a memory cost. That is, no structure must be allocated to keep track of the individual allocations, and the allocations do not degrade the heap.

The permanent memory also provides a beneficial way to perform large-scale accounting of memory usage within an operating computer program. With the present embodiment, a large number of individual objects may be accounted for by looking at the size of a single buffer.

The present invention also provides a "permanent pool" as a combination of the existing memory pool management approaches and the above-stated permanent memory features.

The iterator for the present embodiment is both very fast and essentially free. No permanent structure is required to support the iterator, and moving to the next object is accomplished by incrementing a pointer, such as in walking an array. The iterator property of the present embodiment also allows a permanent pool to be used as structuring devices.

The present embodiment demonstrates particularly attractive use in the construction of hash tables. Because hash tables typically do not have a quick-iteration property, this feature of the present embodiment has application with a large number computer of processes.

A technical advantage of the present embodiment includes the ability to access and use memory objects more rapidly than using known approaches. In a manner similar to that of the Microsoft Corporation NET garbage-collection oriented system, fast object collection occurs. A major exception with the present invention is that it fully avoids the garbage collection process.

Another technical advantage of the present embodiment includes fast reset by taking advantage of the cyclical nature of the processing. During a reset, all objects are deleted together in a single operation which may occur after optionally invoking destructors on the objects of the pool.

Yet another technical advantage of the present invention includes providing convenient and fast enumeration of memory objects. With the present embodiment, all of the objects in the pool may be enumerated implicitly by their addresses. Therefore, no structure is required to maintain the list, and the access pattern maximizes coherency. The maximized coherency provides further performance benefits.

Still another technical advantage of the present embodiment includes the use of the memory pool with hash tables. This feature demonstrates particular utility with cyclical processing patterns.

As another technical advantage, the present embodiment requires reduced overhead in allocation compared with known approaches. The feature derives from eliminating the free list and allocating objects of the size needed instead of over-allocating to specific sizes.

Yet a further technical advantage of the present invention includes the ability to easily validate data by traversing the memory segments in addition to the allocated objects.

These and other advantages of the invention, as well as additional inventive features, will be apparent from the description of the invention provided herein. The intent of this summary is not to be a comprehensive description of the claimed subject matter, but rather to provide a short overview of some of the matter's functionality. Other systems, methods, features and advantages of the invention will be or will become apparent to one with skill in the art upon examination of the following FIGUREs and detailed description. It is intended that all such additional systems, methods, features and advantages be included within this description, be within the scope of the invention, and be protected by the accompanying claims.

BRIEF DESCRIPTIONS OF THE DRAWINGS

For a more complete understanding of the present embodiment, and the advantages thereof, reference is now made to the following brief descriptions which are to be taken in conjunction with the accompanying FIGUREs, in which like reference numerals indicate like features.

FIG. 1 is a block drawing of an exemplary computing system architecture that may operate with the claimed subject matter;

FIG. 2 presents a conceptual diagram of a memory pool or segment as contemplated by one embodiment of the invention;

DETAILED DESCRIPTION OF THE FIGURES

Although described with particular reference to personal computers, the claimed subject matter can be implemented in any information technology system in which it is necessary or desirable to achieve rapid and efficient use of memory resources during processing operations.

Those with skill in the computing arts will recognize that the disclosed embodiments have relevance to a wide variety of computing environments in addition to those specific examples described below. In addition, the methods of the disclosed invention can be implemented in software, hardware, or a combination of software and hardware. The hardware portion may be implemented using specialized logic. The software portion can be stored in a memory and executed by a suitable instruction execution system such as a microprocessor, personal computer or mainframe.

All references, including publications, patent applications, and patents, cited herein are hereby incorporated by reference to the same extent as if each reference were individually and specifically indicated to be incorporated by reference and were set forth in its entirety herein.

In the context of this document, a "recording medium" and "data store" can be any means that contains stores, communicates, propagates, or transports the program and/or data for use by or in conjunction with an instruction execution system, apparatus or device. Recording media and data store can be, but are not limited to, an electronic, magnetic, optical, electromagnetic, infrared or semiconductor system, apparatus or device. Memory, recording media and data store also includes, but is not limited to, for example a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
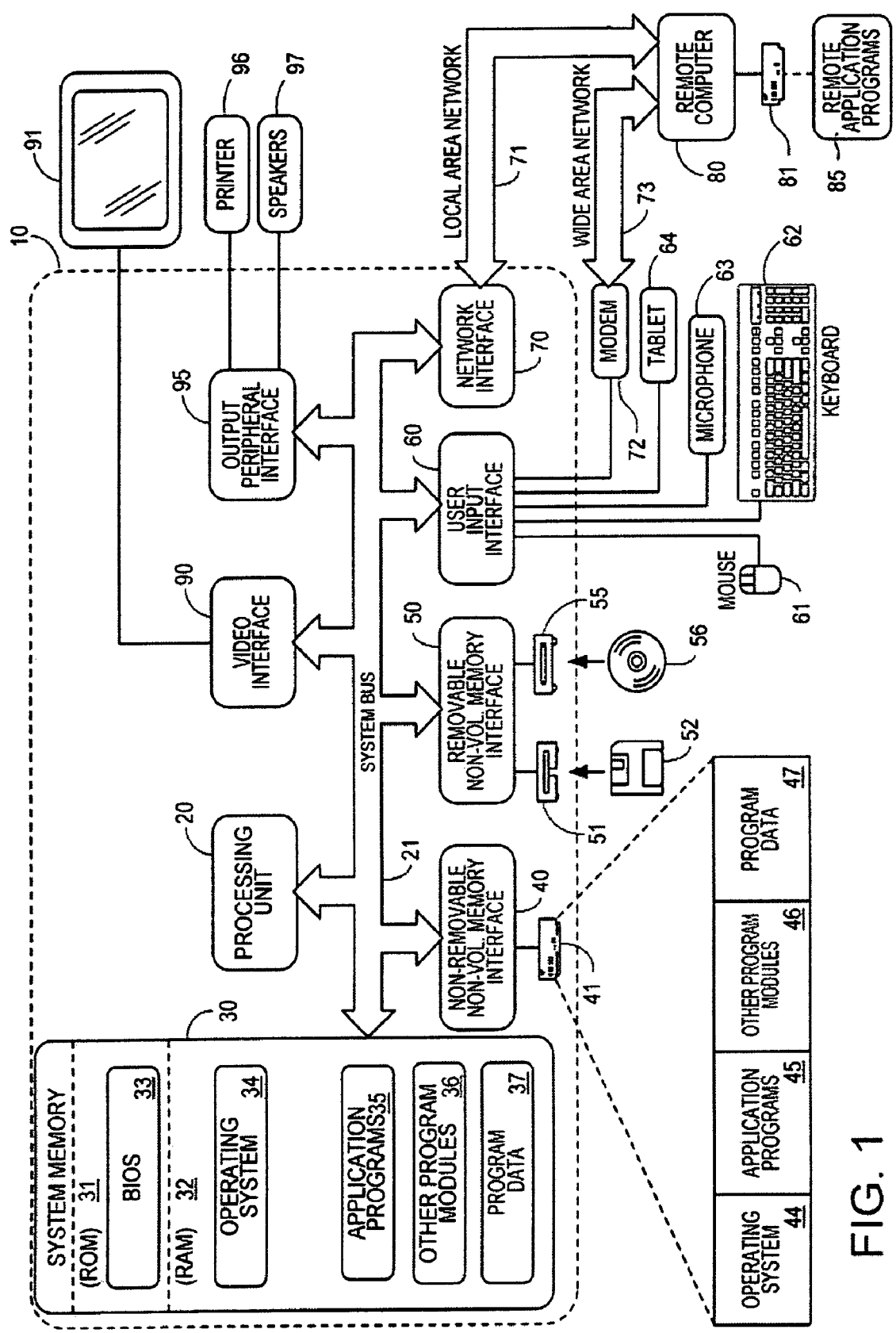

FIG. 1 illustrates an example of a suitable computing system 10 on which the invention may be implemented. The computing system 10 is only one example of a suitable computing environment and is not intended to suggest any limitation as to the scope of use or functionality of the invention. Neither should the computing 10 be interpreted as having any dependency or requirement relating to any one or combination of components illustrated in the exemplary operating computing system 10.

The invention is operational with numerous other general purpose or special purpose computing systems or configurations. Examples of well known computing systems and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that performs particular tasks or implement particular abstract data types. The invention may also be practiced in distributed computing environments wherein tasks are performed by remote processing devices that are linked through a communications network. In a distributed computing environment, program modules may be located in local and/or remote computer storage media including memory storage devices.

With reference to FIG. 1, an exemplary system within a computing environment for implementing the invention includes a general purpose computing device in the form of a computing system 10. Components of the computing system 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures.

Computing system 10 typically includes a variety of computer readable media. Computer readable media can be any available media that can be accessed by the computing system 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 10.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computing system 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37.

Computing system 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computing system 10. In FIG. 1, for example, hard disk drive 41 is illustrated as storing operating system 44, application programs 45, other program modules 46 and program data 47. Note that these components can either be the same as or different from operating system 34, application programs 35, other program modules 36, and program data 37. Operating system 44, application programs 45, other program modules 46, and program data 47 are given different numbers hereto illustrate that, at a minimum, they are different copies.

A user may enter commands and information into the computing system 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB).

A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing system 10 is incorporated, such as in a tablet-type personal computer. In addition, computers such as the computing system 10 may also include other peripheral output devices such as speakers 97 and printer 96, which may be connected through an output peripheral interface 94 or the like.

Computing system 10 may operate in a networked environment using logical connections to one or more remote computers, such as a remote computing system 80. The remote computing system 80 may be a personal computer, a server, a router, a network PC, a peer device or other common network node, and typically includes many or all of the elements described above relative to the computing system 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the present embodiment, the computer system 10 may comprise the source machine from which data is being migrated, and the remote computing system 80 may comprise the destination machine. Note however that source and destination machines need not be connected by a network or any other means, but instead, data may be migrated via any media capable of being written by the source platform and read by the destination platform or platforms.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting, as those of skill in the art will appreciate that several of the acts and operation described hereinafter may also be implemented in hardware.

The present embodiment combines attractive features of the memory pool approaches with the time-boundedness of stack allocations. As such, the present embodiment includes a memory allocation process for establishing a "permanent memory." In establishing a permanent memory, memory is allocated from a large block of memory, as though the memory were in a stack, with the following critical difference: the allocated individual memory blocks cannot be freed individually. This provides a "permanent memory resource for which the entire block must be freed together.

This results in performance similar to an allocation off a memory stack. The benefit occurs, however, without either the restriction of staying within the scope of a function or the difficulty of using the scarce stack memory rather than the more plentiful heap memory. In addition, unlike a memory pool, the objects may have varying sizes. Like the memory pool, however, the allocated individual objects do not incur a memory cost. That is, no structure must be allocated to keep track of the individual allocations, and the allocations do not degrade the heap.

Since the objects cannot be freed independently, the permanent memory of the present embodiment is useful for two main classes of problems. In a first problem class, memory is allocated for the entire lifetime of the program. This avoids the previously stated problems of reduced overhead and heap degradation. Secondly, sets of objects whose required lifetimes end at the same time may also benefit from the features of the present invention.

Both problem classes are quite common. In the case of the latter, the client program needs to keep track of the times at which all of the objects can be freed. However, the actual freeing requires minimal work. The buffer can be "recycled", "reset" or freed outright. If the buffer is recycled then it is essentially wiped clean and made ready for further allocation. The outright freeing, however, contrasts to the time-consuming freeing of many memory pool objects. Each time the program moves through one of these cycles it reuses the same large buffer. This approach avoids degrading the heaps, which, as mentioned above, is important for long-running programs such as computer services.

The permanent memory also provides a beneficial way to perform large-scale accounting of memory usage within an operating computer program. With the present embodiment, a large number of individual objects may be accounted for by looking at the size of a single buffer.

The present invention also provides a "permanent pool" as a combination of the existing memory pool management approaches and the above-stated permanent memory features. As a specialization of permanent memory, the permanent pool adds the restriction of all objects being of the same size. This restriction permits the novel iteration over the set of memory objects that have been allocated from the memory pool. Neither standard memory pools nor the permanent memories possess this property.

The iterator for the present embodiment is both very fast and essentially free. No permanent structure is required to support the iterator, and moving to the next object is accomplished by incrementing a pointer, such as in walking an array. The iteration happens in address order. Address order provides the most efficient process for a computer to perform, thereby, maximizing cache hits and effectiveness of read-aheads.

The iterator property of the present embodiment also allows a permanent pool to be used as structuring devices. That is, when a computer process may benefit from grouping a set of objects, the present embodiment avoids the need to use or construct a container object. The group of memory objects may simply be allocated out of the same permanent pool.

The present embodiment has particular use in the construction of hash tables. There are several reasons for this. Hash tables typically contain large numbers of objects. Typically, hash tables also require a private helper object to support each object placed in them. The resetting of the memory pool eliminates the significant tear down time of conventional processes. The iterator also allows us to rapidly iterate through the helper objects. This provides access to the client objects. Because hash tables typically do not have a quick-iteration property, this feature of the present embodiment has application with a number computer of processes.

The present embodiment includes the ability to access and use memory objects much more rapidly than occurs when using known approaches. In a manner similar to that of the Microsoft Corporation NET garbage collection-oriented system, fast object collection occurs. A major exception with the present embodiment, however, is that it fully avoids the garbage collection process that NET based systems require.

The present embodiment includes fast reset by taking advantage of the cyclical nature of the processing. During a reset, all objects are deleted together in a single operation which may occur after optionally invoking destructors on the objects of the pool.

The present invention includes providing convenient and fast enumeration of memory objects. With the present embodiment, all of the objects in the pool may be enumerated implicitly by their addresses. Therefore, no structure is required to maintain the list, and the access pattern maximizes coherency. The maximized coherency provides further performance benefits.

The present embodiment includes the use of the permanent pool with hash tables. This feature demonstrates particular utility with cyclical processing patterns. Hash table buildup and teardown expenses drop dramatically with the present embodiment. This occurs due to the respective fast object creation and the fast reset functions here presented. The present embodiment provides an enumerator for enumerating the elements in the table, thereby overcoming a particularly troublesome aspect of using hash tables.

The present embodiment reduces overhead in allocation compared with known approaches. The feature derives from eliminating the free list and allocating objects of the size needed instead of over-allocating to specific sizes.

Figure 2:
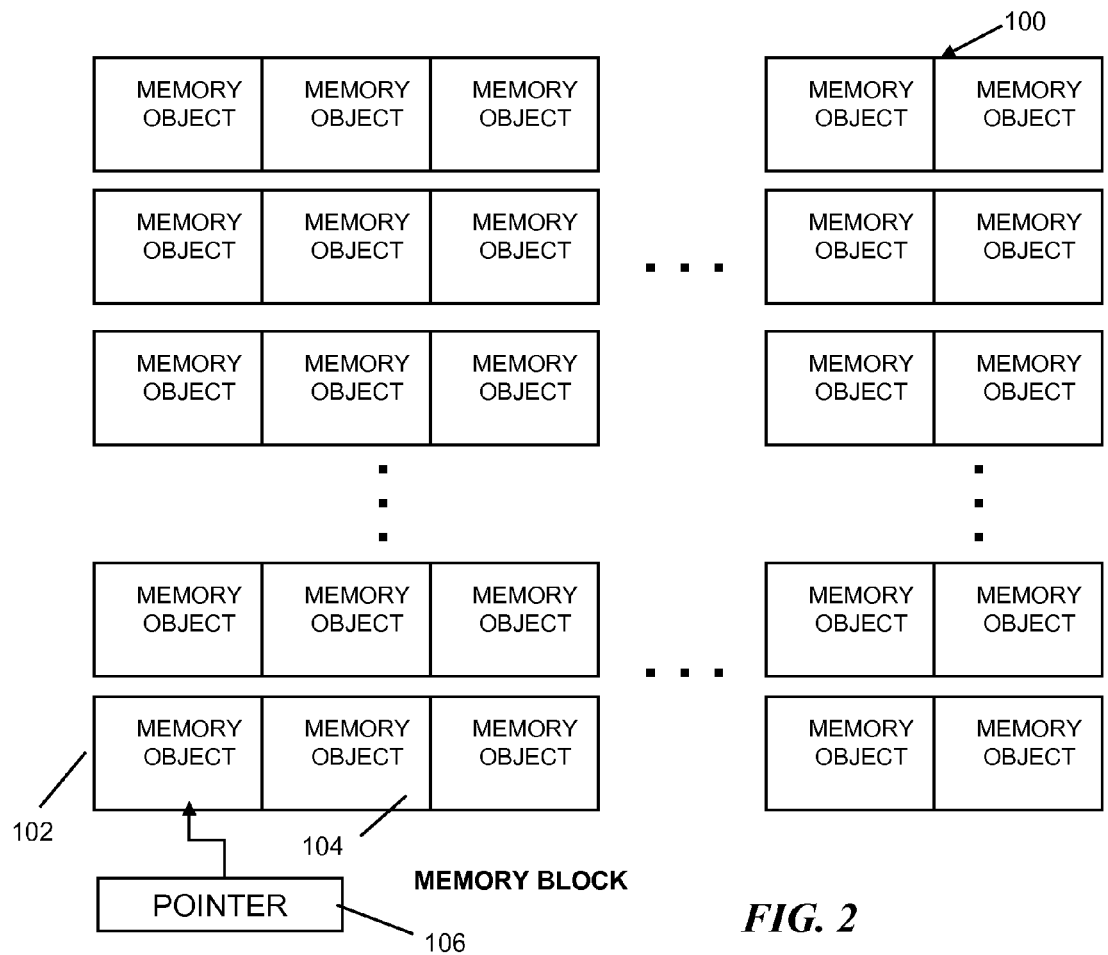
Figure 3:
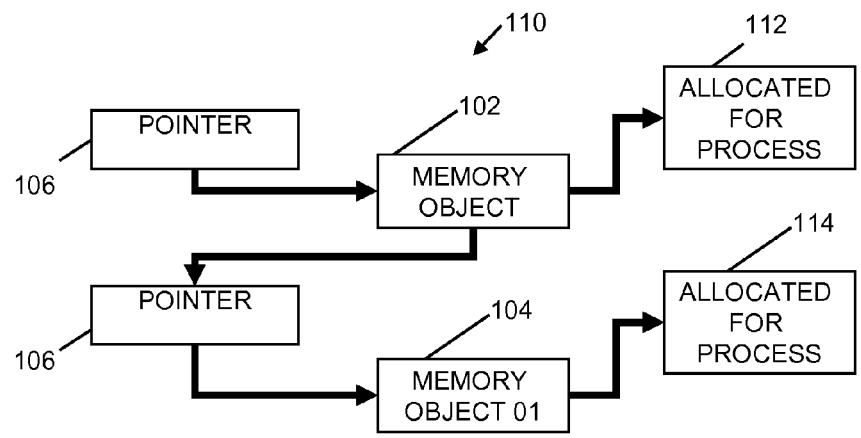
FIG. 3 shows a brief flowchart of the memory object pointing and allocation process of one embodiment of the present invention.

To illustrate these feature and advantages, FIG. 2 conceptually shows memory segment 100 formed according to the teachings of the present embodiment to include memory objects 102 and 104. Pointer 106 directs memory access to memory object 102 in this example. FIG. 3 depicts the function 110 of pointer 106 first starting at memory object 102, although other forms of addressing memory object 102 may apply. In operation, upon pointer 106 designating memory object 102, block 112 associates with the concept of memory object 102 being allocated for the operating computer process. Once allocated, pointer 106 identifies memory object 104. As required, memory object 104 may be allocated for the operating computing process as block 114 further depicts.

Figure 4:
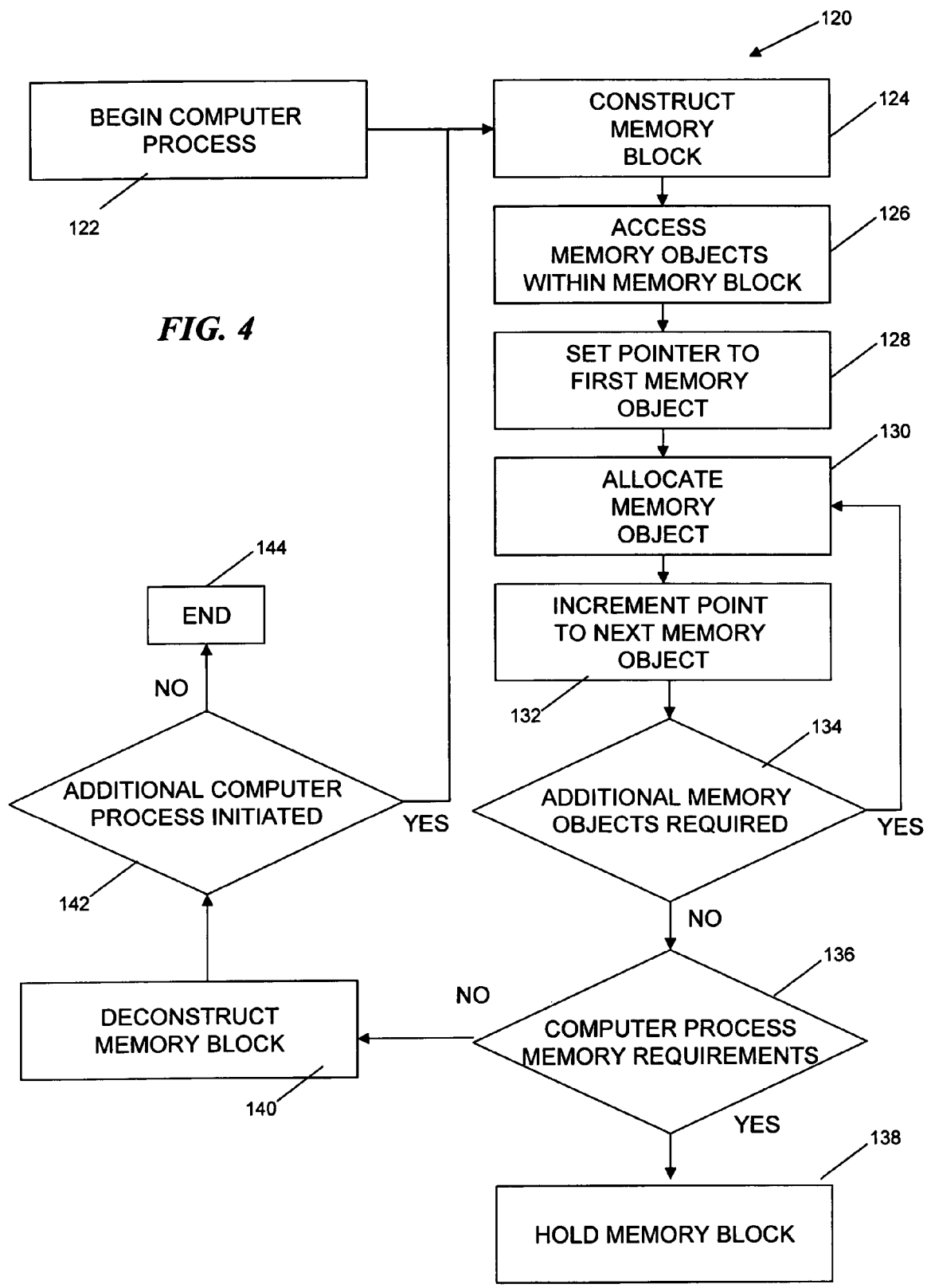
FIG. 4 is a flowchart of a memory block and memory object allocation and management process consistent with the teachings of the present embodiment.

To better understand the overall process of the present embodiment, FIG. 4 presents one example of a memory allocation process 120 for employing the teachings of the present embodiment. Thus, memory allocation process 120 may begin at step 122 at the beginning of a computing process. Then, at step 124, memory allocation process 120 constructs a memory block or segment, such as memory segment 100. Step 126 relates to the step of accessing memory objects within the memory segment 100. At step 128, pointer 104 is set to a first memory object, such as memory object 102 or 104. Then, at step 130 the selected memory object is allocated for use by the computing process. Step 132 involves incrementing pointer 104 to the next memory object, i.e., memory object 104. At query 134, memory allocation process tests whether additional memory objects are needed.

If so, process flow returns to step 130 at which the memory object allocation process repeats. Otherwise, process flow continues to query 136 at which memory allocation process 120 tests whether computer process memory requirements still exist. If so, then step 138 relates to the holding of memory block 100, for example, for further use. If computer process memory requirements are no longer present, then, at step 140, memory allocation process 140 initiates the deconstruction of the memory block or segment. At step 142 a query of whether additional computer processes have been initiated occurs. If so, then memory allocation process 120 routes process flow to step 124 for the formation of another memory block 100. Otherwise, memory allocation process 120 ends.

The memory pool management method and system of the present embodiment, therefore, maintains an array of memory segments, which are large blocks of memory for which size is specified in the construction phase of the process. Objects are allocated consecutively out of this block of memory with no structure to keep track of them. Therefore, if the objects are 50 bytes large, then an allocation step returns the current position pointer to the previous address and then adds 50 bytes to the pointer address. This sets the pointer to point to the position for the next memory object allocation.

Thus, as step 134 depicts, when a memory block is exhausted, the pool allocates another memory block at step 124. Since the present embodiment does not maintain a linked list for each memory object 102, this yields a very high density of useful data. Since The present embodiment avoids the use of linked lists.

Memory allocation process 120 enumerates the pointer 106 by walking through memory segment by memory address. Moreover, since memory allocation process 120 goes through the objects in memory order, the present process minimizes page faults and maximizes cache hits. Both of these features can be very significant when dealing with large data sets.

When memory allocation process 120 resets memory segment 100 by deleting all memory objects within memory segment 100, as step 142 depicts, memory allocation process 120 does not return the various segments to an associate memory management system heap manager. This could be an option of one embodiment, however. Rather, memory allocation process 120 holds onto memory block 100 on the presumption that the supported computing process will need to re-allocate the memory objects again in the future. Resetting memory segment 100 includes resetting the active segment index and the active position pointer. (If the memory objects in question have destructors to be run, then the associate memory management process may run the destructor steps, as needed.

The memory management method, system, and computer program of the present embodiment works very well for programs that have an essentially cyclical processing sequence. For example, in a computing process involving a user interface, the memory allocation process 120 may allocate a large set of objects. When the process finishes analyzing the data for that interface, the computing process frees all of the objects and moves on to the next interface, where memory allocation process 120 repeats the sequence.

The present embodiment solves several problems simultaneously, such as the problem of memory fragmentation. While memory fragmentation will always occur during computer system operation, oftentimes a process can reuse a segment of allocated memory. The present method and system return processing to the same memory segment without performing the teardown processing that normally occurs during computer program operation. In essence, therefore, the present embodiment places boundaries for a permanent pool of memory resources within which the computing system may operate.

A computer program may perform the steps of receiving certain data input, reading the data input into memory, performing certain processes on the data input, and then releasing the memory for subsequent use. This common computer processing sequence involves first determining the need for and obtaining specific computer system resources. Then, through the use of a known memory allocation, degrading the memory resources during the use of such resources. Upon releasing the memory resources further degradation may occur. This continues indiscriminately over time generally to degrade the computer's memory resources during the operation of the particular computer that may be calling for memory resources, as well as other computer programs that may operate simultaneously or subsequently operate on the computer.

The present embodiment, in contrast to known processes, tasks memory allocation process 120 once to obtain a specific memory segment for all iterations involved in the computer program's operation. Throughout the computing process operation, the computing process returns to memory segment 100, for example, for memory objects as determined by pointer 106. Thus, for each iteration of the computing process, instead of returning memory resources to a condition such that they are generally available via the memory allocation program, the present embodiment retains access to the memory segment and does not release memory segment 100. This improves memory segment 100 management to avoid the buildup and teardown sequences of known memory management processes. Just as importantly, the present embodiment takes into consideration the cyclical nature of iterative processes so as to avoid unnecessary memory segment partitioning and subsequent release operations.

The present embodiment may provide a C++ program, written in memory objects 102 that combine the technical features of a memory pool for the purpose of allocating objects of the same size. In forming a memory pool segment 10, memory allocation process dedicates a large memory segment in specifically sized portions (e.g., 64-byte portions) which can be readily available for computer program operations. When a computing process requires a 64-byte segment, memory allocation process 120 draws from memory segment 100. This approach avoids fragmenting memory resources because the segments are always 64-byte segments. On the other hand, this approach requires designating the number and size of such memory segments at the beginning of the computer program's operation.

In many processes, there is a significant initialization step, which involves reading a set of configuration instructions and beginning an initialized state by allocating memory to store the configuration data. With the memory allocated according to the teachings of the present embodiment, it is possible to maintain the allocated memory during the entirety of the process. The present embodiment, therefore, cooperates with a memory management application in the control of memory resources. Since the allocated memory will not be released during the operation of the memory management application, the present embodiment avoids the overhead of the process of allocating and reserving the ability to return the memory during the process. By eliminating the need for small strings, which are necessary to reserve the right to return the memory during the process, the present embodiment more effectively use processing infrastructure and associated operational resources during computer processing.

With the combined aspects of the permanent memory and the memory pool in a unified approach, it is possible to avoid the need to construct a linked list, as is normally required for memory resource allocation and use. That is, the permanent memory object first allocates a large memory block. Once the acquired block of memory has been used by the computing process. If the process requires additional memory resources, the permanent memory object simply acquires additional memory. By acquiring contiguous blocks of memory, the permanent memory object provides an efficient memory management process.

Iteration processes becomes more efficient in execution through the use of coherent access to memory resources. Although present day use of abstract tools for memory allocation may obfuscate considerations of memory location, when incoherent access to memory resources occurs operational inefficiencies still arise. As a computing process loads memory at certain rates, e.g., 256 bits per load, each memory access requires processor operational resources. The cost of such processor operational resources, if saved, will significantly improve overall processing speed and efficiency.

By avoiding the need for pointers, the present embodiment eliminates the multiple steps in identifying memory objects as well as the need to determine memory resources in anticipation of using them. For example, a computer operating system typically seeks to estimate the need for memory resources for steps in advance through the use of a look-ahead function. Because the present embodiment allocates blocks of memory, an iterative process need only "walk through" memory as the process demands it. This avoids the use of a linked list. Moreover, even in the situation of requiring a linked list, the contiguous memory objects of memory block 100 yields operational efficiencies. This is because the memory addresses of each memory object are close to one another and the iterator may use memory resources in numerical order.

The present embodiment also permits the segregation of objects that otherwise would require maintenance or capture during a computer process. That is, the iteration process of the present embodiment does not the same level of infrastructure as is required for the pointers that identify, access, and release non-contiguous blocks of memory. Many processes require the segregation of memory objects. The present embodiment permits the creation of lists of segregated objects without the need for the associated overhead of known processes that includes maintaining an array that keeps track of otherwise segregated objects. This is because the memory objects are in the permanent pool ready for use and, accordingly, susceptible to segmentation directly within the pool.

Thus, the present embodiment avoids the known steps of accessing a linked list, then setting a pointer in response to information from the linked list, using the pointer to seek and free the identified memory segment, and resetting the point to be available to re-access the linked list in preparation for obtaining the next identifier from the linked list. The present embodiment avoids essentially all of these steps by making available to the process sequential memory objects.

Still further, the present embodiment avoids the buildup process to provide memory objects to a computer process, as well as the operationally expensive teardown process of known memory allocation processes.

Figure 5:
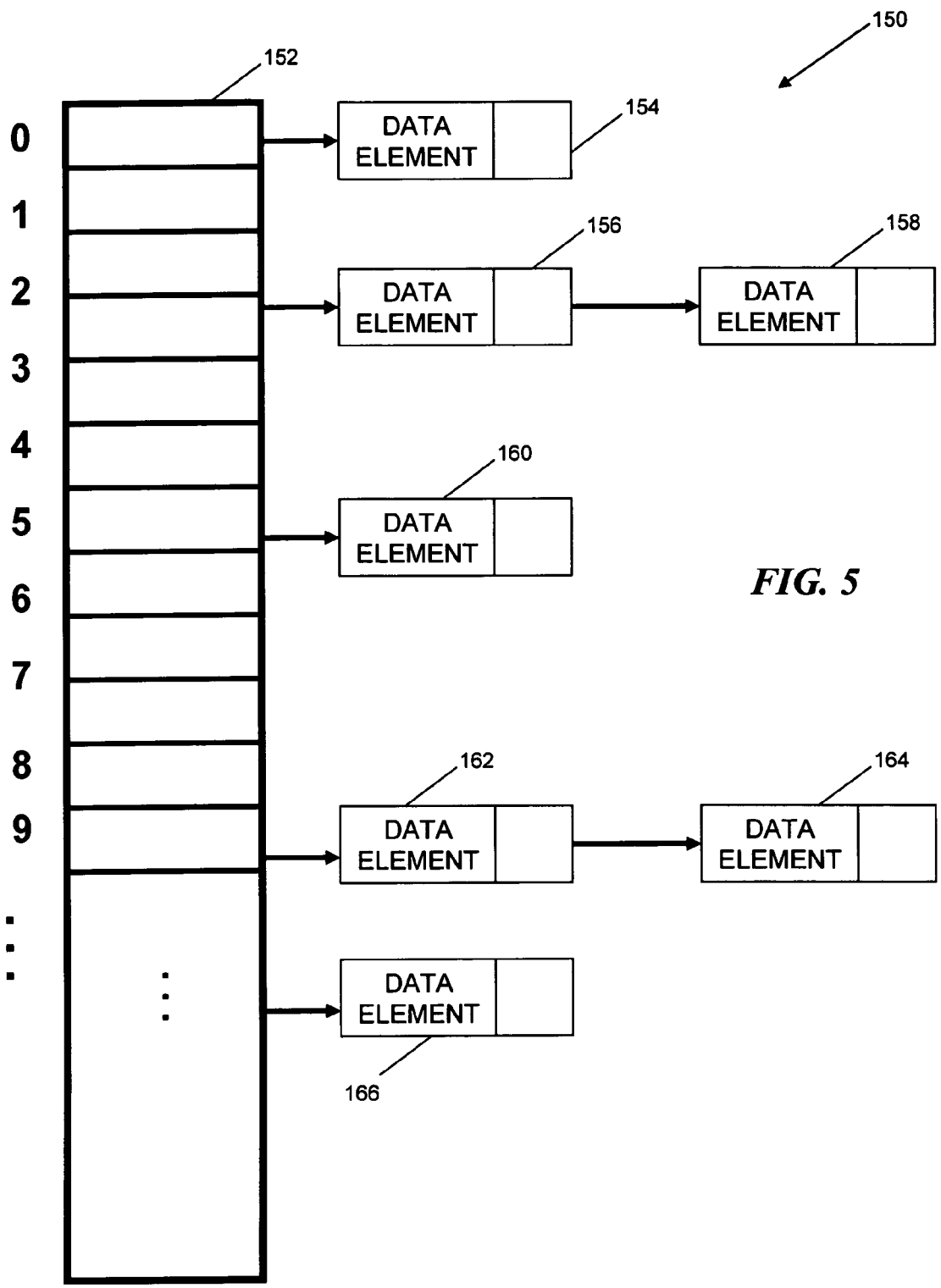
FIG. 5 depicts a conceptual flow diagram for a hash table implementation of the present embodiment.

Certain processes require the use of hash tables. FIG. 5, therefore depicts a hash table process 150 with which the present embodiment provides a particularly attractive use. Referring to list 152, hash table process 150 illustrates the process of migrating from list 152 to various associated data elements 154 through 166. Note that, as with a typical hash table, data elements are reference sequentially, e.g., data element 156 then data element 156, or data element 162 then data element 164 until the process obtains a desired or specified element in the hash table.

Hash tables provide an attractive solution to the search problem. A hash table stores key-value pairs. Given a key, for example, hash table process 150 search an identified hash table 152 for a corresponding key-value pair. When a hash table implements a set, the values are all null, and the only question is whether or not the key occurs in the set. Still, the process searches for the key to determine its presence.

Most search algorithms find a specific item looking through a large number of non-related items that are not of interest. To find something in an unsorted list, the search examines though items one-by-one until the specified item is found. A binary sort tree, for example, starts at the root and moves down the tree until the specified item occurs. A key-value pair search in a hash table, on the other hand, goes directly to the location that contains the specified item without requiring a search through other items. The location of the key-value pair is computed from the key: The process examines the key and goes directly to its storage location.

As an example, if the keys were integers in the range 0 to 99, a hash table 152 may store the key-value pairs in an array, A, of 100 elements. The key-value pair with key N would be stored in A[N]. The key directs process flow directly to the location of the key-value pair. The problem is that there are usually far too many different possible keys to be able to use an array with one location for each possible key. If the key can be a string of any length, then the number of possible keys is infinite, and using an array with one location for each possible key is simply impossible.

Since there are fewer array locations than there are possible keys, a process may seek to store two or more keys in the same array location. This is called a collision. A hash table must handle collisions in some reasonable way. In the type of hash table that is used in Java, each array location actually holds a linked list of key-value pairs (possibly an empty list). When two items have the same hash code, they are in the same linked list.

In FIG. 5, data element 154 associates with hash code 0, no items with hash code 1, two items data elements 156 and 158 associate with hash code 3, and so on. In a properly designed hash table, most of the linked lists are of length zero or one, and the average length of the lists is less than one. Although the hash code of a key does not necessarily direct process flow to that key, there are probably no more than one or two other items that must be examined to look through before finding the desired key. For this to work properly, the number of items in the hash table should be somewhat less than the number of locations in the array. Hash tables provide the ability to quickly and accurately identify and retrieve a specific data element. In accessing a hash table, a key element provides an address for a predetermined specific data element.

The key enables accessing the specific data element at a specific location in the hash table. Unfortunately, in the establishment and use of a hash table, a large number of small data elements may arise. These small data elements may be in a linked list such that an even more complex infrastructure investment arises in the hash table formation. This is true especially because each data element in the hash table includes an associated linked list. The construction of these linked lists and associated pointers consumes significant operational resources during the computing process. Thus, all of the problems associated with using a linked list, e.g., build up and tear down requirements, are multiplied in the use of a hash table. These costs must be weighed against the benefits of using the hash table, which provides for rapid access to the predetermined and specific data elements.

With the present embodiment, on the other hand, a hash table can be a particularly useful and operational efficient device. Because the present embodiment establishes a contiguous pool of memory objects, there is the ability to relate specific addresses of a hash table with the addresses of the memory objects. The present embodiment provides operational resource and time savings in (1) the initial allocation of memory objects; (2) the allocation of memory objects from a permanent pool, thereby permitting iterating such objects in their entirety; (3) the accessing of memory objects in their use with a hash table; (4) the avoidance of the linked lists tear down at process termination; and (5) the tear down of the hash table having linked list associations. In addition, since the memory objects are coherent, the overall process using the memory objects becomes more efficient.

Moreover, when hash table use involves iteration, the present embodiment's use of contiguous memory objects provides even further operational resource savings. Hash table use involves instantaneous look up of specifically identified data. To avoid conflicts in the storage and use of data elements, oftentimes hash tables are formed as large array structures within the process environment. Unfortunately, an iterative process without the use of the present embodiment involves the stepping through a large hash table, one data element at a time, using all of the associated linked lists and other infrastructure elements. Such a process becomes highly expensive for process environment resources.

Use of the present embodiment in association with an iterative process also relates to data element degradation. In known processes, degradation occurs with each iteration of the associated process. With the present embodiment's permanent allocation of memory for each process, a clean memory segment is used at process initiation. The result is a more efficiently operating process with few interruptions and failures.

The present embodiment has use in a memory management library and set of related applications. The present embodiment is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present embodiment can be implemented using software running (that is, executing) in an environment similar to that described above. In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

While various embodiments of the present embodiment have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present embodiment should not be limited by any of the above-described exemplary embodiments, but should be defined only in accordance with the following claims and their equivalents. Various software embodiments are described in terms of this example computer system. After reading this description, it will be apparent to a person skilled in the relevant art how to implement the invention using other computer systems and/or computer architectures.

What is claimed is:

1. A method for managing a computing system memory device in the operation of a computing process, comprising the steps of:

constructing at least one memory segment for providing memory resources for the computing process, said memory segment comprising a plurality of contiguous consecutively ordered memory objects, each of said memory objects comprising a fixed equal number of bytes and having a predetermined order relating to the memory address of each of said plurality of memory objects;

enumerating each of said plurality of contiguous consecutively ordered memory objects according to said predetermined order of each of said plurality of memory objects within said at least one memory segment;

constructing a pointer identifying a first memory object from said plurality of memory objects, said first memory object having a first ordered position according to said predetermined order;

allocating said first memory object from said memory segment during the operation of the computing process;

incrementing said pointer to a second memory object, said second memory object having second ordered position relative to said first memory object;

continuing said allocating step and said incrementing step on subsequently ordered memory objects of said memory segment as required by said computing process;

deconstructing said at least one memory segment only upon said computing process no longer requiring said memory resources; and resetting said at least one memory segment by deleting all of said plurality of memory objects in a single operation.

2. The method of claim 1, further comprising the step of constructing a plurality of said at least one memory segments for traversing from a first one of said at least one memory segment to a second one of said at least one memory segment and in cooperation with each of said first and second one of said at least one memory segment performing said pointer constructing, said memory object allocating, and said pointer incrementing steps for managing a computing system memory device in the operation of said computing process.

3. The method of claim 1, wherein said constructing step further comprises the step of constructing said at least one memory segment to comprise said plurality of memory objects without the use of a garbage collection process for managing said plurality of memory objects.

4. The method of claim 1, further comprising the step of managing said computing system memory device in association with an iterative computing process.

5. The method of claim 1, further comprising the step of managing said computing system memory device in association with the formation and use of a hash table for organizing and accessing a predetermined data set.

6. A system for managing a computing system memory device in the operation of a computing process, comprising:

a storage medium;
a processor connected to said storage medium and said processor:

constructing at least one memory segment for providing memory resources for the computing process, said memory segment comprising a plurality of contiguous consecutively ordered memory objects, each of said memory objects comprising a fixed equal number of bytes and having a predetermined order relating to the memory address of each of said plurality of memory objects;

enumerating each of said plurality of contiguous consecutively ordered memory objects according to said predetermined order of each of said plurality of memory objects within said at least one memory segment;

constructing a pointer identifying a first memory object from said plurality of memory objects, said first memory object having a first ordered position according to said predetermined order;

allocating said first memory object from said memory segment during the operation of the computing process;

incrementing said pointer to a second memory object, said second memory object having second ordered position relative to said first memory object;

continuing said allocating step and said incrementing step on subsequently ordered memory objects of said memory segment as required by said computing process;

deconstructing said at least one memory segment only upon said computing process no longer requiring said memory resources; and resetting said at least one memory segment by deleting all of said plurality of memory objects in a single operation.

7. The system of claim 6, further comprising constructing a plurality of said at least one memory segments for traversing from a first one of said at least one memory segment to a second one of said at least one memory segment and in cooperation with each of said first and second one of said at least one memory segment performing said pointer constructing, said memory object allocating, and said pointer incrementing steps for managing a computing system memory device in the operation of said computing process.

8. The system of claim 6, wherein said constructing step further comprises constructing said at least one memory segment to comprise said plurality of memory objects without the use of a garbage collection process for managing said plurality of memory objects.

\* \* \* \* \*